United States Patent [19]

Onarheim

[11] 3,925,058

[45] Dec. 9, 1975

[54] METHOD OF RECYCLING SILICON DIOXIDE

[75] Inventor: Einar Onarheim, Vagsbygd, Norway

[73] Assignee: Elkem-Spigerverket A/S, Oslo, Norway

[22] Filed: Aug. 12, 1974

[21] Appl. No.: 496,404

Related U.S. Application Data

[63] Continuation-in-part of Ser. No. 301,350, Oct. 27, 1972.

[30] Foreign Application Priority Data

Nov. 8, 1971 Norway.............................. 4108/71

[52] U.S. Cl. .............................. 75/1; 75/3; 75/25; 423/335

[51] Int. Cl.².... C22B 1/00; C22B 1/08; C22B 7/02; C01B 33/12

[58] Field of Search.................................. 75/1, 3–5, 75/25; 423/335–340

[56] References Cited
UNITED STATES PATENTS 2,631,178    3/1953    Morton........................ 75/25

*Primary Examiner*—Peter D. Rosenberg
*Attorney, Agent, or Firm*—Eyre, Mann & Lucas

[57] ABSTRACT

Silicon dioxide dusts recovered from metallurgical processes are formed into pellets without binder and then immediately sintered at temperatures of 800° – 1200°C without previous drying whereafter the pellets can be recycled to metallurgical processes.

4 Claims, No Drawings

METHOD OF RECYCLING SILICON DIOXIDE

The present application is a continuation-in-part of Ser. No. 301,350 filed Oct. 27, 1972 and priority is claimed on the basis of Norwegian Application No. 4108/71 filed Nov. 8, 1971.

The present invention relates to a new and useful process for recycling silicon dioxide dust recovered from metallurgical processes.

In the production of silicon metals and alloys which are rich in silicon a large amount of silicon dioxide dust is formed. This dust is very fine in nature and can have a specific surface of up to 400,000 $cm^2/cm^3$. These dusts are very voluminous and are carried up from the metallurigcal process in the flue gases. Because of current environmental considerations, it is necessary to recover these dusts as for example with bag filters, electrofilters, gas scrubbers and other known recovering techniques. While the dust can be recovered in this manner, it has heretofor been primarily an unwanted by-product. Some applications have been found for use of the recovered dust such as in the anti-caking of fertilizers but these uses are not sufficient to employ all of the silicon dioxide dust which is recovered.

It has previously been proposed that the silicon dioxide dust recovered from the flue gases be recycled to certain metallurgical processes where silicon dioxide is utilized thus eliminating the need for quartz which is the usual source for silicon dioxide in smelting furnaces. However, because of the dusting problems associated with these dusts recovered from metallurgical processes, this has not proved practical.

It has been proposed to form the silicon dioxide into pellets by the addition of water and then drying, but it has been found that the strongly hydrated pellets will usually explode and disintegrate into a myriad of pieces, thus rendering it unusable. One solution to this problem is to use a binder for the silicon dioxide but this is considered undesirable since it introduces a foreign agent to the smelting furnace.

The applicants have now surprisingly discovered that the silicon dioxide dust can be formed into mechanically strong pellets without binder by admixing the dust with a sufficient amount of water to form a pellet and then sintering the pellets directly in a shaft furnace at temperatures between 800° – 1200°C. It is absolutely essential in this process that the pellets not be dried before they are placed in the shaft furnace for sintering or the problems mentioned hereinbefore of exploding and resulting unusabilty are encountered. Put another way, immediately after formation of the pellets they must be directly subjected to sintering temperatures of at least 800°C.

When the pellets are prepared in accordance with the present invention, it has been found that they are mechanically very strong with a compression strength of 40 – 150 kilos or more which is sufficient for use in smelting furnaces. When the pellets are tested for dust formation (through 1 millimeter) they are found to have less than 2 – 4% dust after 5000 revolutions in a ribbed drum and this dust is within the acceptable limits for smelting furnaces.

The amount of water to be added to form the pellets is critical in that no more than about 25% water by weight dust can be employed. The exact amount of water will necessarily vary depending upon the specific characteristics of the silicon dioxide dust recovered. The amount of water should be sufficient to form cohering pellets but should not be so much that the resulting mass is in the nature of a liquid. With silicon dioxide dust having a specific surface of about 400,000 $cm^2/cm^3$, it has been found that water in the amount of about 20 – 25% is acceptable. In general, the amount of water necessary will be from about 18% to 28%.

The pellets of the present application are formed by known pelletizing techniques such as on an inclined rotating disc or in a revolving drum. The pellets are formed by the revolving movement of the material on the disc or in the drum, and the necessary amount of water is sprayed on the dry material, on the disc or in the drum, without any previous mixing of dust and water. The size of the thus formed pellets will be from about 1 to about 5 cm in diameter. It is necessary in order to be recycled to smelting furnaces that the pellets have a minimum diameter of at least 1 cm.

In one specific example, dust recovered from bag filters in a smelting furnace producing 75% ferrosilicon was pelletized in a revolving drum with the addition of 25% water. The pellets having an average diameter of about 2 cm were then immediately sintered in a shaft furnace without permitting them to dry out before the sintering. Samples were taken at different temperatures for measurement of compression strength and dust formation.

Dust formation is measured in the same manner as described hereinbefore. The results of the tests are summarized in the table below:

TABLE

| Sintering temperature, °C | Compression strength, Kgs. | Dust formation % thru 1 mm |
|---|---|---|
| 620 | 8 | 22 |
| 700 | 18 | 11 |
| 800 | 46 | 4 |
| 900 | 73 | 4 |
| 1000 | 136 | 2 |

It will be understood that the claims are intended to cover all changes and modifications of the preferred embodiment of the invention herein chosen for the purpose of illustration which do not constitute departure from the spirit and scope of the invention.

What is claimed is:

1. The method of recycling silicon dioxide dust to smelting furnaces comprising:
   a. recovering silicon dioxide-containing flue dusts from smelting furnaces producing materials rich in silicon;
   b. pelletizing said recovered flue dust by admixing it with water in sufficient amount to form cohering pellets of a minimum diameter of at least about 1 cm consisting essentially of said recovered flue dust and water;
   c. immediately thereafter and without a previous drying step subjecting the pellets to sintering temperatures of from about 800° to about 1200°C. to form a mechanically strong pellet having a compression strength of at least about 40 kgs.; and
   d. introducing the thus formed pellets into a smelting furnace.

2. The method of claim 1 wherein the sintering takes place in a shaft furnace.

3. The method of claim 1 wherein the silicon dioxide dust has a specific surface of about 400,000 $cm^2/cm^3$.

4. The method of claim 1 wherein the silicon dioxide dust is admixed with from about 20 to about 25% water.

* * * * *